United States Patent [19]

De Filippo

[11] Patent Number: 5,722,728
[45] Date of Patent: Mar. 3, 1998

[54] HEADREST FOR MOTOR VEHICLE SEATS

[75] Inventor: Emilio De Filippo, Bruzolo, Italy

[73] Assignee: Gestind-M.B. "Manifattura di Brusolo" S.p.A., Bruzolo, Italy

[21] Appl. No.: 767,041

[22] Filed: Dec. 12, 1996

[30] Foreign Application Priority Data

Jul. 16, 1996 [IT] Italy ............... TO96A0610

[51] Int. Cl.$^6$ ............................................. A47C 1/10
[52] U.S. Cl. ............................. 297/408; 297/DIG. 2
[58] Field of Search ........................... 297/391, 410, 297/463.2, DIG. 2, 440.1

[56] References Cited

U.S. PATENT DOCUMENTS

| 4,350,389 | 9/1982 | Parsson et al. | 297/410 |
| 4,637,655 | 1/1987 | Fourrey et al. | 297/410 |
| 4,923,250 | 5/1990 | Hattori | 297/410 |
| 5,007,678 | 4/1991 | DeKraker | 297/410 X |
| 5,131,720 | 7/1992 | Nemoto | 297/410 |
| 5,222,784 | 6/1993 | Hamelin | 297/410 X |
| 5,257,853 | 11/1993 | Elton et al. | 297/391 |
| 5,288,129 | 2/1994 | Nemoto | 297/410 |
| 5,433,508 | 7/1995 | Akima et al. | 297/410 |

FOREIGN PATENT DOCUMENTS

| 3141515 | 4/1983 | Germany | 297/410 |
| 3624397 | 1/1988 | Germany | 297/410 |
| 4319120 | 2/1994 | Germany | 297/410 |
| 2057255 | 4/1981 | United Kingdom | 297/410 |

*Primary Examiner*—Milton Nelson, Jr.
*Attorney, Agent, or Firm*—Sughrue, Mion, Zinn, Macpeak & Seas, PLLC

[57] ABSTRACT

A headrest for motor vehicle seats therein two support rods projecting from a resilient body are slidably mounted through a pair of tubular guide elements rigidly secured to the structure of the backrest of the seat so as to allow height adjustment of the headrest. The lower ends of the support rods are rigidly connected to each other by a transverse member to which a remote control operating device is operatively connected to perform raising and lowering thereof.

6 Claims, 2 Drawing Sheets

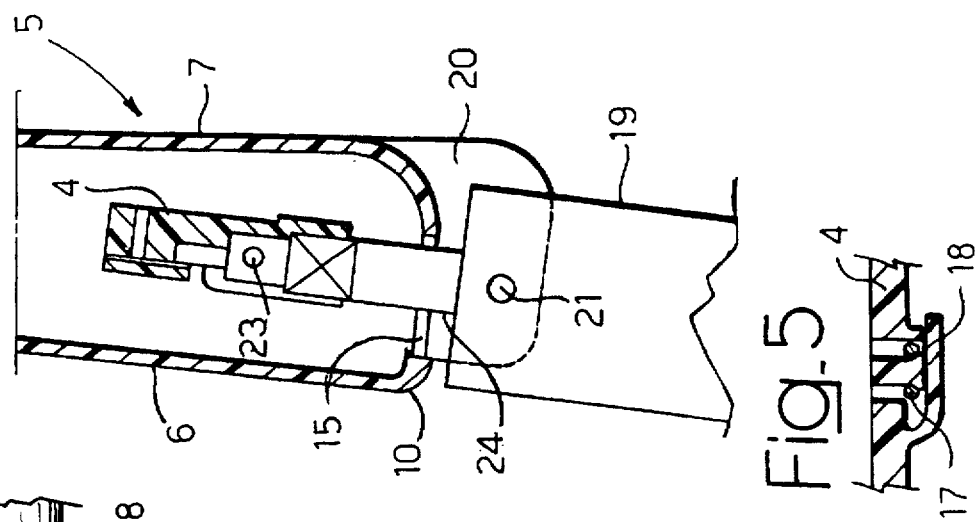
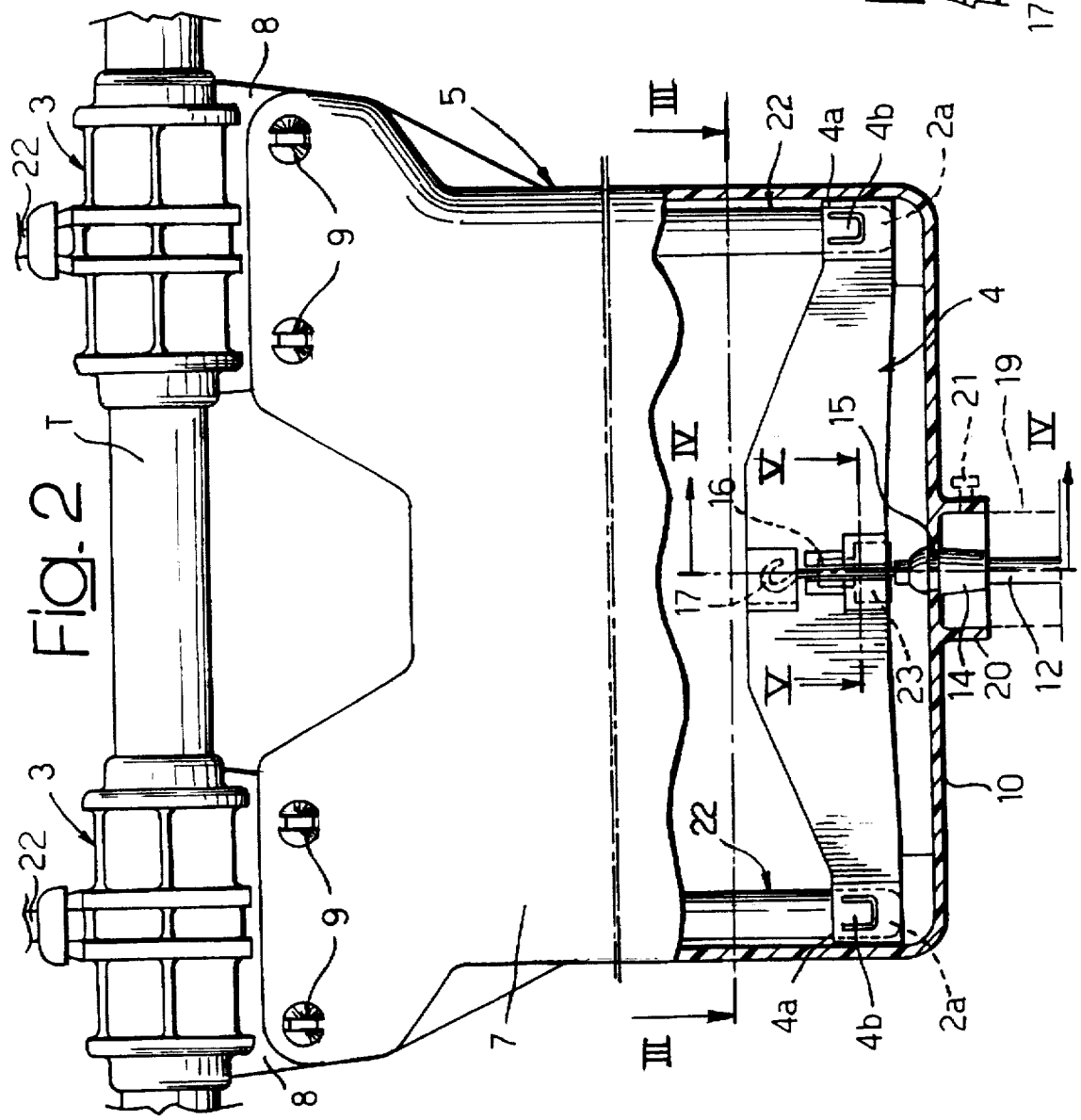

HEADREST FOR MOTOR VEHICLE SEATS

BACKGROUND OF THE INVENTION

The present invention relates to headrests for motor vehicle seats, comprising a resilient body, a pair of parallel support rods projecting from the resilient body, and a pair of tubular guide elements to be rigidly secured to the structure of a seat backrest and through which said support rods are slidably mounted so as to allow height adjustment of the resilient body of the headrest.

In the following description and claims the terms "lower", "upper","raising","lowering" and the like are to be intended referred to the mounted condition of the headrest on top of the backrest of a motor vehicle seat.

In the headrests of the above-referenced type height adjustment of the resilient body is generally performed manually raising and lowering this body, which is normally difficult, uncomfortable and unpractical. Motor-driven adjustment systems have also be provided, which are however relatively complicated and expensive and additionally require considerable constructive complications for installation thereof within the seat backrest.

SUMMARY OF THE INVENTION

The object of the present invention is to overcome the above drawbacks, and more particularly to provide a headrest for motor vehicle seats of the type set forth in the above, provided with an extremely simple and cheap operating device, both from the point of view of manufacturing and in connection to mounting thereof within a seat backrest, for height adjustment of the headrest.

According to the invention, this object is achieved essentially by virtue of the fact that the headrest further comprises a transverse member rigidly connecting the lower ends of the support rods, and remote control operating means operatively connected to said transverse member to perform raising and lowering thereof.

According to a preferred embodiment of the invention, the headrest further comprises a box-like protection body secured to said pair of tubular guide elements and housing said support rods and said transverse member, and the operating means are supported by the bottom wall of this box-like body.

The operating means may comprise a flexible cable transmission, with a sheath having one end anchored to the bottom wall of the box-like body, or a motor-driven actuator carried by the bottom wall of the box-like body, and conveniently swingable around an axis parallel to the transverse member.

BRIEF DESCRIPTION OF THE DRAWINGS

The invention will now be disclosed in detail with reference to the accompanying drawings, purely provided by way of non-limiting example, in which:

FIG. 2 is a rear elevational view according to arrow II of FIG. 1 in an enlarged scale, showing a portion of the headrest of the invention according to a first embodiment; in the same figure, a second embodiment is partially shown in dotted lines, FIG. 4 is a vertically sectioned and enlarged view along line IV—IV of FIG. 2, expressly related to the second embodiment, and FIG. 5 is a horizontally sectioned view along line V—V of FIG. 2.

DETAILED DESCRIPTION OF THE INVENTION

Figure 1:
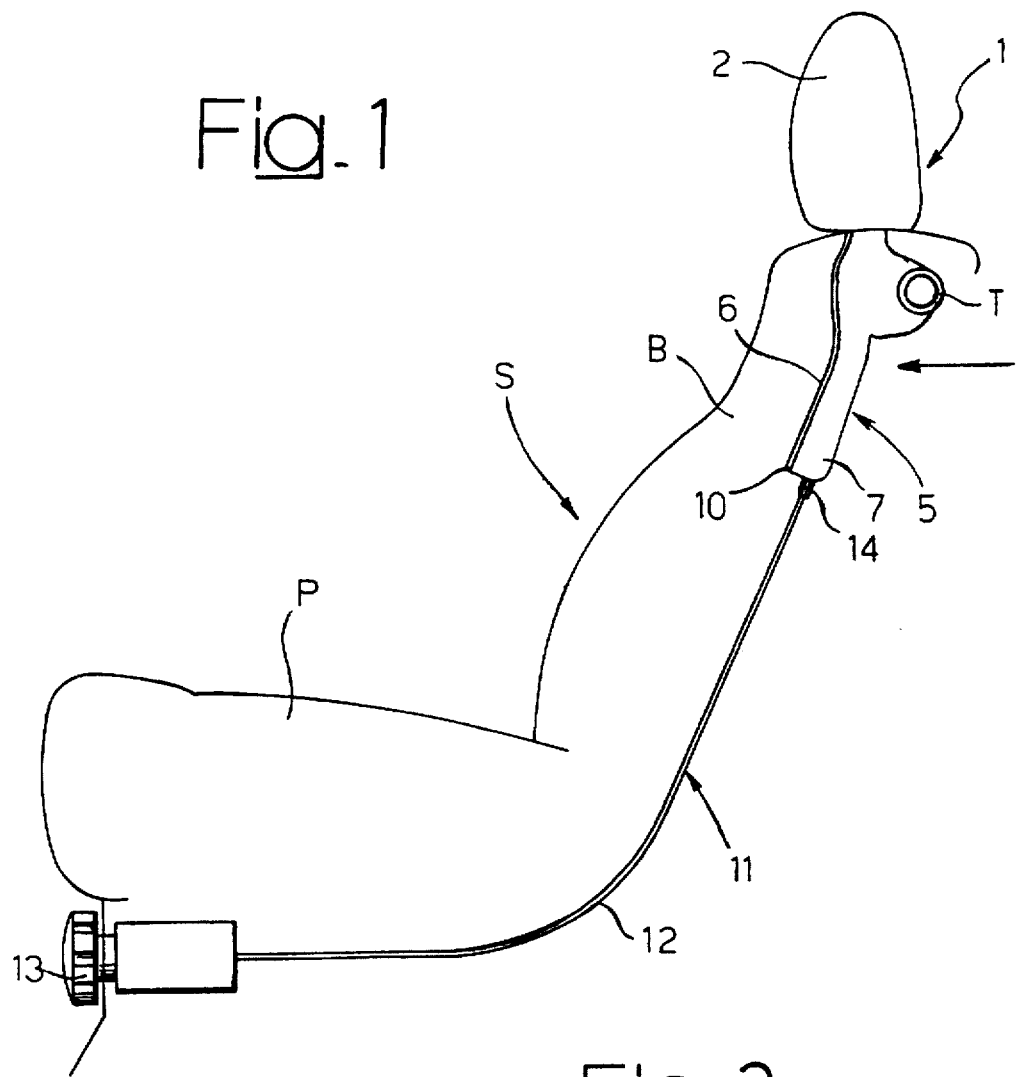
FIG. 1 is a side elevational diagrammatic view showing a motor vehicle seat provided with a headrest according to the invention.
Figure 3:
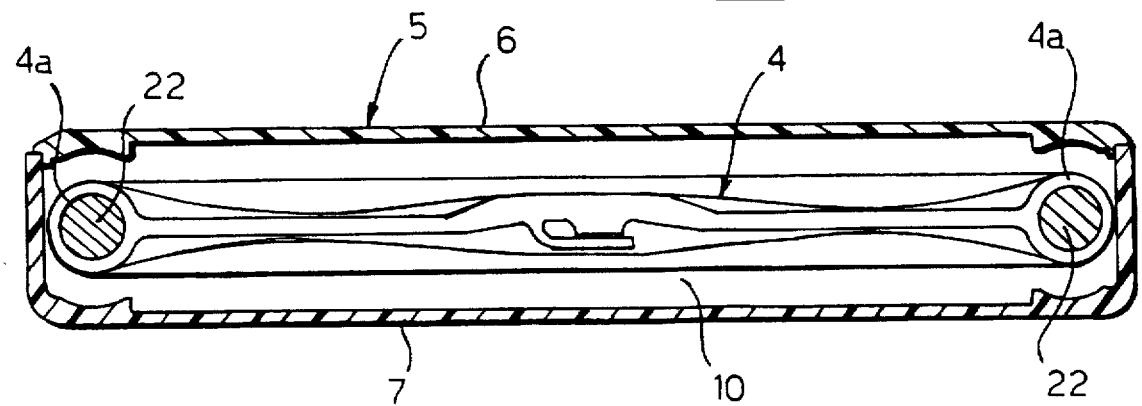
FIG. 3 is a horizontally sectioned and enlarged view along line III—III of FIG. 2.

Referring initially to FIG. 1, reference S diagrammatically indicates a motor vehicle seat comprising a cushion P and a backrest B, on top of which a headrest 1 according to the invention is located. The headrest essentially comprises a resilient body or pillow 2, normally made of foamed plastic material and incorporating a supporting framework not shown in the drawings, since generally conventional, in turn rigidly or tiltably connected to a pair of parallel support rods 22, shown in FIGS. 2 and 3, projecting downwardly from the base of the resilient body 1. The support rods 22 extend within the backrest B of the seat S and are connected to the supporting structure thereof, namely to an upper transverse member T, by means of a pair of moulded plastic material bushes, generally designated as 3. In the shown example, the two bushes 3 are directly overmoulded, upon forming thereof, on the transverse member T. In alternative, these bushes 3 may be formed in one piece with a connecting plate, which in turn is mechanically secured to the supporting structure of the backrest B. The two support rods 22 are frictionally slidable through the bushes 3, to the aim of allowing height adjustment of the resilient body 2 relative to the backrest B. These support rods 22 are normally arcuate or curved, with their concavity facing forwardly (i.e. to the left with reference to FIG. 1) so as to perform during raising of the resilient body 2 a forward displacement thereof, compensating the backward slant of the backrest B. According to a first aspect of the invention, the lower ends of the two support rods 22, designated as 2a, are rigidly connected to each other by a transverse member 4, which is conveniently made of moulded plastic material, having hollow ends 4a anchored to the lower ends 2a of the support rods 22, conveniently by means of snap-fit engagements. To such effect, the hollow ends 4a of the transverse member 4 are formed with respective resilient wings 4b snap-fitted into corresponding notches (not depicted in the drawings) of the lower ends 2a of the support rods 22. Reference numeral 5 designates a box-like protection body, also made of moulded plastic material, which is rigidly secured to the two bushes 3 and within which the support rods 22 with the transverse member 4 are housed. The box-like body 5 is formed by a front half-shell 6 and by a rear half-shell 7 connected to each other and to lower plate appendages 8 of the two bushes 3, by means of snap-fit engaging members 9. According to the invention, the bottom wall 10 of the box-like body 5 acts as a support for a remote control operating device operatively connected to the transverse member 4 so as to perform raising and lowering of the support rods 22 and, consequently, of the resilient body 2 of the headrest 1 relative to the backrest B. The invention provides two alternative embodiments of the control operating device. The first embodiment, shown in FIG. 1 and with full line in FIG. 2, comprises a flexible bowden-cable transmission 11, with a sheath 12 extending between a manual control unit 13 (for instance positioned at one side of the cushion P of the seat S) and an attachment member 14 anchored in correspondence of a central aperture 15 of the bottom wall 10 of the box-like body 5. A metal cable 16 is slidable within the sheath 12, whose end projecting outwardly of the attachment member 14 is formed with a hook member 17 in turn connected to a quick-connection central portion 18, shown in detail in FIG. 5, of the transverse member 4. In the variant shown with dotted lines in FIG. 2 and in FIG. 4, the remote control operating device is comprised of an electrical motor 19, connected to an electrical control circuit (not shown in the drawings since generally conventional), and also directly connected to the bottom wall 10 of the box-like protection body 5. Since, as explained in the above, the two support rods 5 are normally arcuate, and therefore the respective lower ends 2a together with the transverse member 4 will move along a curvilinear path during raising and lowering thereof, the electrical motor 19 is connected to the box-like body 5 in a swingable way around an axis parallel to the transverse member 4. To such effect, the bottom wall 10 of the box-like body 5 is integrally formed with an outwardly projecting bracket 20 to which the body of the motor 19 is pivoted around a transverse pin 21. As shown in FIG. 4, the shaft 24 of the electrical motor 19 passes through the aperture 15 of the bottom wall 10 and is connected, for instance by means of a transverse pin 23, to the central area of the transverse member 4. The pivoted connection of the motor 19 to the box-like body 5 is not necessary in case the support rods 22 are rectilinear instead of curved.

Naturally, the details of construction and the embodiments may be widely varied with respect to what has been disclosed and illustrated, without thereby departing from the scope of the present invention, such as defined in the appended claims.

What is claimed is:

1. A headrest for a motor vehicle seat having a backrest with a bearing structure, comprising a resilient body, a pair of parallel support rods having respective lower ends projecting from said resilient body, and a pair of tubular guide elements to be rigidly secured to said structure of the seat backrest and through which said support rods are slidably mounted so as to allow height adjustment of said resilient body, and further comprising a transverse member rigidly connecting said lower ends of the support rods, and remote control operating means operatively connected to said transverse member to perform raising and lowering thereof, wherein said transverse member is made of moulded plastic material and is snap-fit connected to said lower ends of the support rods.

2. Headrest according to claim 1, further comprising a box-like protection body secured to said pair of tubular guide elements and housing said support rods and said transverse member, said box-like protection body having a bottom wall supporting said operating means.

3. Headrest according to claim 2, wherein said operating means comprise a flexible cable transmission with a sheath having one end anchored to the bottom wall of said box-like body.

4. Headrest according to claim 2, wherein said operating means comprise a powered actuator carried by the bottom wall of said box-like body.

5. Headrest according to claim 4, wherein said powered actuator is swingably connected to the bottom wall of said box-like body around an axis parallel to said transverse member.

6. A headrest for a motor vehicle seat having a backrest with a bearing structure, comprising a resilient body, a pair of parallel support rods having respective lower ends projecting from said resilient body, and a pair of tubular guide elements to be rigidly secured to said structure of the seat backrest and through which said support rods are slidably mounted so as to allow height adjustment of said resilient body, a transverse member rigidly connecting said lower ends of the support rods, remote control operating means operatively connected to said transverse member to perform raising and lowering thereof, and a box-like protection body secured to said pair of said tubular guide elements and housing said support rods and said transverse member, said box-like protection body having a bottom wall supporting said operating means, wherein said tubular guide elements are formed by moulded plastic material bushes and said box-like body is formed by a pair of moulded plastic material half-shells secured to each other and to said bushes to snap-fit coupling means.

* * * * *